Feb. 12, 1924. 1,483,114
F. H. ROOT
CHANGE SPEED POWER TRANSMITTING MECHANISM
Filed Feb. 4, 1921 2 Sheets-Sheet 1
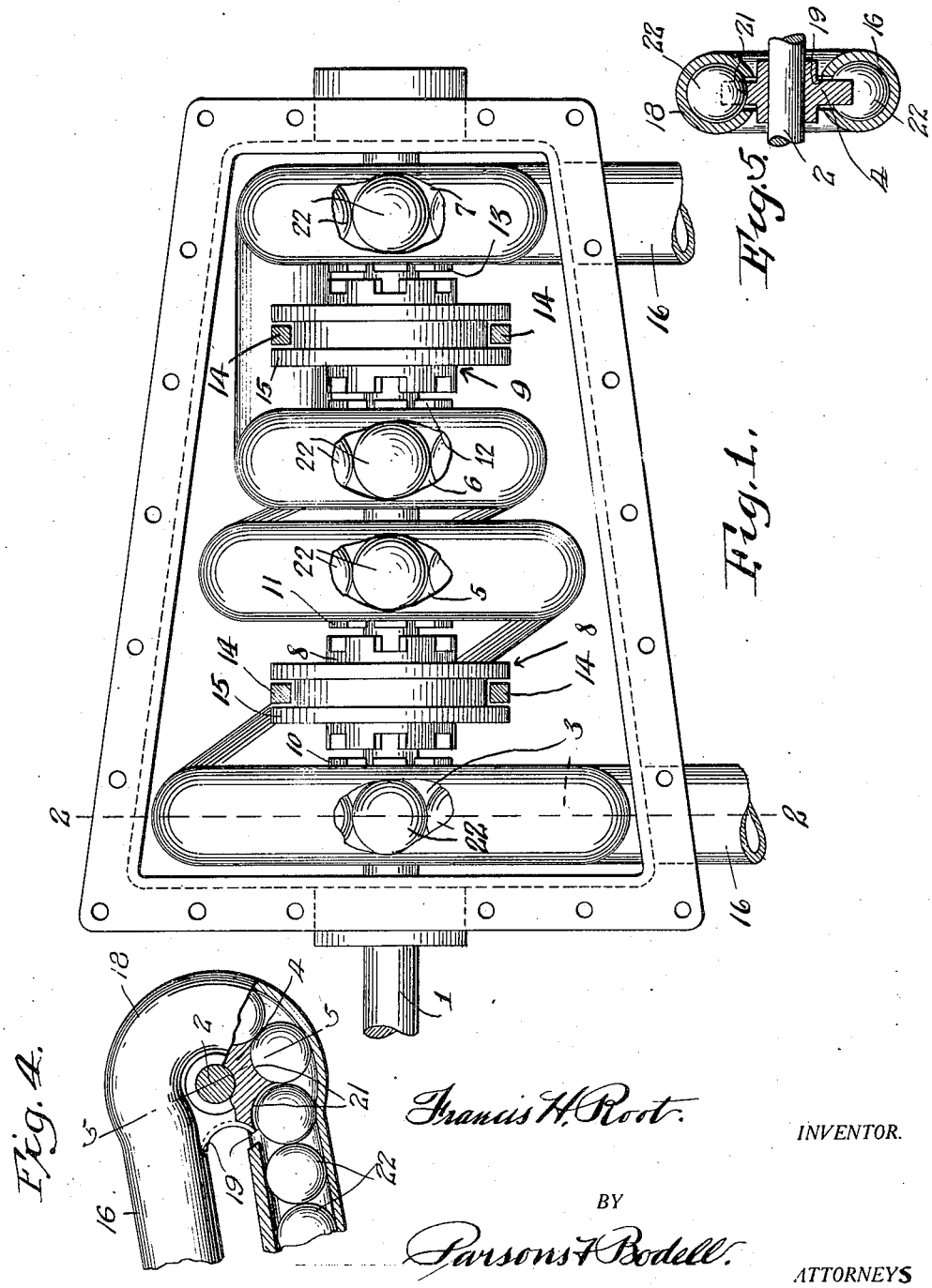
INVENTOR.
BY
ATTORNEYS

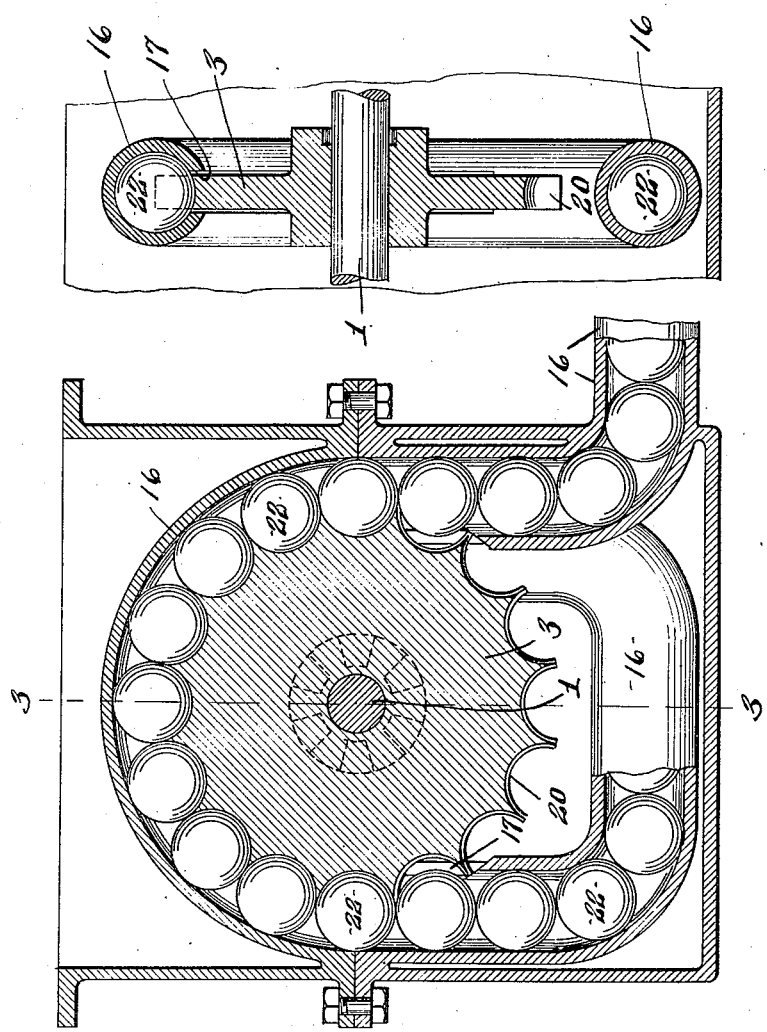

Patented Feb. 12, 1924.

1,483,114

UNITED STATES PATENT OFFICE.

FRANCIS H. ROOT, OF WATERTOWN, NEW YORK.

CHANGE-SPEED POWER-TRANSMITTING MECHANISM.

Application filed February 4, 1921. Serial No. 442,411.

*To all whom it may concern:*

Be it known that I, FRANCIS H. ROOT, a citizen of the United States, and a resident of Watertown, in the county of Jefferson and State of New York, have invented a certain new and useful Change-Speed Power-Transmitting Mechanism, of which the following is a specification.

This invention relates to change speed power transmitting mechanism, and has for its object a particularly simple and efficient mechanism which eliminates gears, chains and the like. The invention consists in the novel features and in the combinations and constructions hereinafter set forth and claimed.

In describing this invention, reference is had to the accompanying drawings in which like characters designate corresponding parts in all the views.

Figure 1 is a plan view of the driving portion of the power transmitting mechanism, the same being shown as enclosed in a suitable casing.

Figure 2 is a sectional view on line 2—2, Fig. 1.

Figure 3 is a sectional view on line 3—3, Fig. 2.

Figure 4 is an elevation partly in section of the driven member and contiguous parts.

Figure 5 is a sectional view on line 5—5, Figure 4.

This change speed power transmitting mechanism comprises, generally, driving and driven elements or shafts, wheels mounted on the shafts, a continuous conduit extending around the wheels of the driving and driven shafts and formed with slots for receiving the portions of the wheels, motion transmitting means movable along the conduit and being pushed or propelled through the conduit by the driving wheel to the driven wheel, and means for changing the speed or rate of propulsion of said means.

1 designates the driving element or shaft and 2 the driven element or shaft, the shafts 1, 2 being here shown as arranged parallel to each other.

3 and 4 are respectively, driving and driven wheels as socket wheels mounted on the shafts 1 and 2 respectively, one of these shafts being provided with a plurality of wheels and as here shown the driving shaft in addition to the wheel 3 is provided with wheels 5 and 6 of different diameters and also with another reverse wheel 7.

The wheels 3, 5, 6 and 7 are normally loosely mounted on the shaft and are connectible, selectively thereto by suitable means of clutches as jaw clutches 8, 9 shiftable from neutral positions into engagement respectively with jaws 10, 11, and 12, 13 provided respectively on the heads of the wheels 3, 5, and 6, 7. These clutches are shiftable in any suitable manner as by forks 14 working in grooved collars 15 provided on the clutches. The driven wheel 4 is fixed to the shaft 2.

16 is a continuous conduit looped around the wheels 3, 5, 6 and 7, and 4 and extending in coils between the wheels 3, 5 and 5, 6 and in a reverse coil between the wheels 6 and 7, these conduits or the coils thereof having slots 17 for receiving the peripheries of the wheels 3, 5, 6 and 7 and the loop 18 of the conduit around the driven wheel 4 having a similar slot 19. The wheels 3, 5, 6 and 7 are formed with peripheral sockets as 20 and the driven wheel 4 is formed with similar sockets 21, the sockets being here shown as constructed to receive balls 22 which constitute power transmitting medium which is forced through the tube or conduit 16 by the action of the wheel 3, 5, 6 or 7 which is clutched to the shaft 1, the balls pushing one against the other.

When the wheel 3 is clutched to the shaft 1 a high speed is transmitted to the shaft 2, the wheels 5, 6 and 7 now running idle. Intermediate and low speeds are obtained by clutching the wheel 5 and 6 respectively to the shaft and reverse speed is obtained, by clutching the wheel 7 to the shaft.

In operation, the shaft 1 is connected to a suitable motor and when any one of the wheels 3, 5, 6 and 7 is clutched to the shaft 1 such wheel pushes the balls 21 through the conduit causing them to impart a rotary movement of the driven wheel 4 and shaft 2.

What I claim is:

1. A change speed power transmitting mechanism comprising driving and driven shafts, and power transmitting mechanism between the shafts comprising wheels mounted on the shafts, a continuous conduit looped around the wheels, the conduit being formed with slots for receiving the peripheries of the wheels, power transmitting means movable in the conduit and acting on the wheels, and mechanism for connecting and disconnecting the wheels on one of said shafts to and from said shaft, substantially as and for the purpose described.

2. A change speed power transmitting mechanism comprising driving and driven shafts, and power transmitting mechanism between the shafts comprising socket wheels mounted on the shafts, a continuous conduit looped around the wheels and having slots for receiving the peripheries of the wheels, balls rolling in the conduit one against the other and fitting the sockets of the wheels, and means for connecting and disconnecting the wheels on one of said shafts to and from said shaft.

3. A change speed power transmitting mechanism comprising a driving shaft, a driven shaft, and connections between the driving and driven shaft comprising a socket wheel fixed to one of said shafts, a plurality of socket wheels of different diameters mounted on and normally disconnected from the other of said shafts, means for connecting any of the latter wheels to its shaft, a conduit extending between the shafts and being looped around said wheels, the portions of the conduit around the wheels being formed with slots for receiving the peripheries of the socket wheels, and balls running in the conduit one against the other and substantially filling the same and arranged to fit into the sockets of the socket wheels, substantially as and for the purpose set forth.

In testimony whereof, I have hereunto signed my name, at Syracuse, in the county of Onondaga and State of New York, this 4th day of January, 1921.

FRANCIS H. ROOT.